Sept. 15, 1964

R. V. HARRIS 3,148,536

ULTRASONIC THICKNESS GAGE

Filed April 10, 1961

INVENTOR.
ROBERT V. HARRIS

BY *Robert Elmer Norton*

ATTORNEY

United States Patent Office 3,148,536
Patented Sept. 15, 1964

3,148,536
ULTRASONIC THICKNESS GAGE
Robert V. Harris, Darien, Conn., assignor to Branson Instruments, Inc., Stamford, Conn., a corporation of Connecticut
Filed Apr. 10, 1961, Ser. No. 102,034
12 Claims. (Cl. 73—67.8)

This invention relates to an improved ultrasonic resonance thickness gauge.

In the past ultrasonic resonance thickness gauges have achieved great commercial success. For the first time it has become possible to gauge thicknesses of material continuously and even when only one side of the material is accessible, as the outer walls of tanks, ship hulls and the like. Essentially the device comprised a frequency modulated oscillator, that is to say an oscillator in which frequency sweeps through a predetermined range at a predetermined sweep frequency. The oscillator feeds a transducer, for example a piezoelectric transducer, which is moved in contact with the surface to be measured, normally with a thin film of liquid to assure good sonic coupling. The oscillator includes within its circuitry a take-off representing a point where oscillator amplitude changes. From this take-off a signal is amplified and applied to the vertical plates of an oscilloscope, the horizontal sweep thereof being fed in synchronism with the sweep frequency of the oscillator. This type of gauge which is extensively sold under the trade name of "Vidigage" by Branson Instruments Inc. has revolutionized the continuous measurement of moving material as to thickness, or alternately by moving the transducer over a surface such as that of a tank or ship hull thickness can be determined by measurement from one side only. Effective as the instrument is it is still subject to two drawbacks or limitations which have hitherto been noted in all ultrasonic resonance instruments. It is with the elimination of these limitations that the present invention deals.

The first drawback is that when the transducer is in contact with a hard surface, such as metal, wear takes place even though there may be very thin films of liquid such as water or oil between the transducer surface and the metal. In some cases this may adversely affect the metal surface, and in all cases it results in a premature wearing out of the transducer. The second serious drawback is that it may be necessary to measure the thickness of an article at fairly high temperatures; for example a hot extruded steel tube may not have cooled down to room temperature before it is desired to measure its dimensions. Many transducers are extremely sensitive to excessive temperatures. When the temperature exceeds the Curie point most piezoelectric transducers of the modern ceramic type lose their piezoelectric properties. As a result ordinary ultrasonic thickness gauges have not been useful in measuring hot materials. Both of these drawbacks are completely eliminated by the present invention.

It has been an axiom of ultrasonic resonance gauging practice that the measuring transducer must be coupled to the article it is measuring through a very thin film of liquid. If it is attempted to use thicker films, for example .25" or .5" thick, no useful measurements are obtained because there are so many resonances in the liquid column that the desired measurement is completely masked.

It has been found according to the present invention that there is a secondary resonance effect which can be observed through a relatively long column. This column may be, and for many purposes preferably is, a liquid column, such as a column of water. However, the effect can even be noted in solid materials such as Lucite, aluminum, lead, etc. These materials differ in acoustic properties from the vibrating elements and may be used where the angle at which measurements have to be made is such that a liquid column is not practicable. Where they can be used, however, liquid columns present many advantages and so are preferred. The secondary resonance effect is a damping of the resonances within the intervening column at the resonance frequencies of the material being tested.

Thus if a great number of resonances are observed for the thickness of the intervening column a sharp attenuation of the resonances occurring at the frequencies corresponding to the resonant frequencies of the material under test is observed. Following this sharp attenuation is a sharp rise in the amplitude of the intervening column resonances corresponding to the normal resonance curve. By proper adjustment of the amplifier, for example by bias adjustment, only the peak amplitude resonance indications are observed which permits detection of the frequencies of the resonance of material under test superimposed on the resonance pattern of the intervening column.

The normal thickness gauge has an amplifier with a time constant suitable for a response to the relatively short duration resonance indication observed in contact testing which may, for example, have a duration of the order of 100 microseconds. It is necessary to introduce somewhere into the gauge an integrating effect so that only the envelope of the resonances corresponding to thickness of the material, flaws and the like, will be displayed. This can be effected in various ways because the length of the column, the frequency range of the test, modulation frequency, and amplifier time constants are inter-dependent. Thus, without actually changing the components of a typical thickness gauge it is possible to display only the resonances of the material, without showing the resonances of the column, by a sufficiently long column. For example, in the case of water, which is the most common material in a liquid column, if the column is lengthened to from 5 to 8" only the test material resonances will be shown. This is useful for certain purposes and it is an advantage of the present invention that for certain purposes a standard gauge can be used, requiring only the interposition of a relatively long column between the transducer and the material being tested. However, very long columns results in severe attenuation of the resonance responses and so for most work, particularly where the gauge is always to be used with an interposed column, it is preferable to modify the gauge by introducing additional circuits of longer time constant between the pre-amplifier and the final power amplifier. This makes for a more flexible instrument, permits the use of very moderate liquid columns or other material columns, and permits maximum sensitivity. Therefore, the modified gauge in which there is an additional circuit is preferred, and such a preferred instrument will be described in the more specific description of the invention although a standard gauge may be used by appropriate lengthening of the intervening column between transducer and test material.

When an additional circuit with longer time constant is interposed this time constant may be considerably longer than that actually required for certain column lengths. It is in no sense critical and does not have an appreciable effect on the accuracy of the measurement. This may be brought out by a numerical example. With a water column of 1" a frequency range of 2.5 to 5 mc. and a modulation frequency of 60 c.p.s., a time constant of approximately 6 milliseconds is required to integrate the water column resonances. If the length of the column is increased to 2" no change needs to be made although theoretically the time constant required with the longer range would be only 3 milliseconds. Because of the added sensitivity and sometimes added convenience excessive column lengths are not preferred.

The present invention presents many advantages. First of all, there is negligible wear on the transducer itself, and if the preferred liquid column is used there is no effect on the surface tested. Secondly, quite a hot solid can be moved through a liquid column without evaporating too much liquid, or in the case of a solid column, such as one of aluminum, air cooling can be effected by providing fins. This protects the transducer against destruction by excessive heat. It has been found that at an extreme, using water as the column and providing a steady flow of water, even hot iron rods, plates or tubes can be measured. Of course, with higher temperatures there may be a considerable amount of water boiled off, and in such cases the flow should be sufficient to maintain the column. Where practical it is desirable to keep the heat of the test material moderate, though it is an advantage of the present invention that even quite high temperatures can still be present without adversely affecting the measurement.

It is an advantage of the present invention that many standard components may be used. For example, when cathode ray display is desired the standard measuring instrument sold under the trademark "Vidigage" requires only the provision of a small container to hold a liquid or other column between the transducer and the material to be investigated, or in the case of the preferred model, the addition of a simple integrating circuit which can be arranged in plug in form. The use of standard components to so large an extent is an economical advantage, and it also gives great flexibility. For example, the instrument can be used either under the present invention or in the customary manner where the higher sensitivity of a direct coupled transducer may be required in special cases, and where the cost of rapid transducer wear can be tolerated. The use of most of the components of the gauge for either purpose makes it unnecessary to provide for multiplicity of instruments for different operating conditions.

The electronic circuits in the sweep oscillator are well known and standard. Typical circuits are described in U.S. Patents 2,431,233 and 2,431,234. Accordingly in the specific description which follows this portion of the electronics will be shown simply in block diagram form. The output device, which is a standard oscilloscope, will also be shown diagrammatically.

The invention will be described in greater detail in conjunction with the drawings in which.

Figure 1:
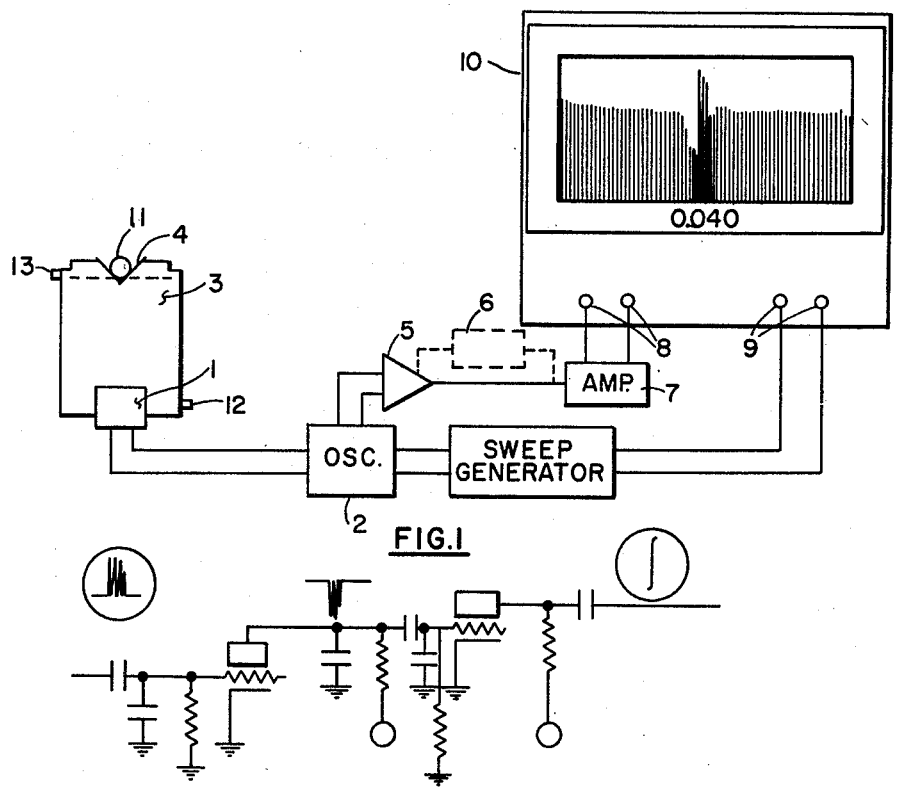
FIG. 1 is a semi-diagrammatic illustration of the invention, partly in section.

In FIG. 1 the piezoelectric transducer is shown at 1 at the bottom of a column 3 of a suitable liquid such as water. The transducer is fed by a conventional sweep frequency oscillator 2 and sweeps through a predetermined band of vibrational frequencies at a set repetition rate. At the top of the liquid column is a support 4 for the material to be handled which is shown as a continuously extruded tube which is simultaneously moved and rotated. The output of the oscillator is passed through a pre-amplifier 5 having a short time constant. An integrating circuit 6 is provided which can be plugged in if desired into the output of the pre-amplifier. Finally a power amplifier 7 produces the final amplification for the vertical input of an oscilloscope 10 provided with a cathode ray tube 8 and horizontal sweep input terminals 9. The latter are fed by a sweep generator in synchronism from the oscillator and the oscilloscope is swept horizontally at the frequency repetition rate. Along the face of the oscilloscope is a scale below the cathode ray tube face which is calibrated in thickness.

The face of the cathode ray tube in FIG. 1 shows the full set of resonances of the water column on which there is superimposed in the neighborhood of the 0.040 mark a resonance from the tube 11. The display is that which would be seen if the integrating circuit 6 were not plugged in, and if the amplifier is not adjusted so that only peaks are shown. In other words, this is the display of the gauge when adjusted for use without the intervening column of the present invention.

Figure 2:
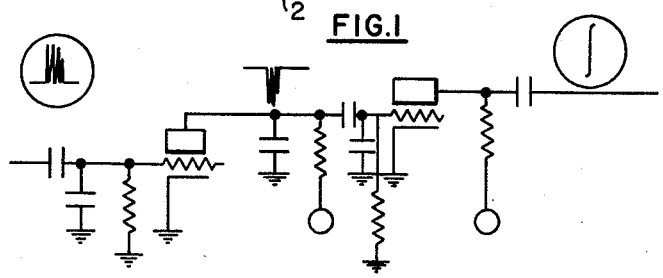
FIG. 2 is a schematic of an integrating circuit shown in FIG. 1.
Figure 3:
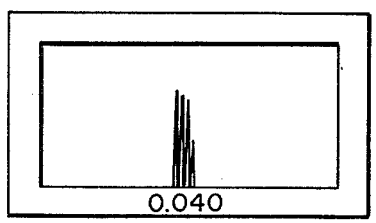
FIG. 3 is an oscillogram with amplifier bias registering only peaks.
Figure 4:
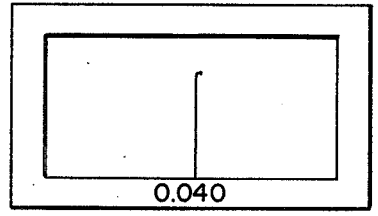
FIG. 4 is another oscillogram with the integrating circuit of FIG. 2 included.

FIG. 3 shows the display after amplifier adjustment so that only the peaks appear. When the integrating circuit 6 is plugged in the final display is as shown in FIG. 4 which shows a sharp indication of the envelope of the resonance peak only. For clarity also the wave form at different points of FIG. 2 is also shown above the corresponding portions of the circuit. It will be noted that FIG. 2 shows a conventional two-stage integrating circuit. When dealing with a water column of 1" and a frequency range of 2.5 to 5 mc. the resistance and capacity values of FIG. 2 are chosen for a time constant of 6 milliseconds.

Where there is need for measuring quite hot materials there may be a considerable amount of water boiled off, and in such cases it is desirable to provide for a continuous flow. In FIG. 1 this is illustrated by an inlet and outlet opening 12 and 13 respectively in the container for the liquid column 3. Where temperatures are lower and there is no significant loss of water the provision for continuous flow need not be used.

There has been described a device particularly for the measurement of the thickness of moving material, such as an extruded tube. The present invention may also be used with stationary material such as a tank or a ship hull. In this case the sensing head of the instrument is moved over the surface to be gauged. With horizontal surfaces which can be reached from below, such as the bottom of a tank, no problem is presented. However, when it is necessary to measure vertical walls the maintenance of a liquid column can present quite a problem. In such cases the use of a solid rod such as a rod of Lucite, may be preferable. The same advantages are obtained as with the liquid column, transducer wear is minimized. However, the ability to handle very hot material is, of course, not obtainable if the solid column is of low melting material. However, for the gauging of thickness of walls of tanks, ship hulls and the like, there is ordinarily no temperature problem involved.

In the drawings there has been illustrated an instrument with an oscilloscope for display which instantly indicates thickness. For some purposes where maximum portability is desirable there has been developed a simpler gauge in which the frequency is adjusted manually until a point of resonance is reached, which will ordinarily be indicated audibly in head phones. Such an instrument is sold by Branson Instruments under the trademark "Audigage." The simple circuitry is described in U.S. Patent 2,522,924. The advantages of the present invention are obtained in a similar manner as with the more sophisticated gauge using oscilloscope display.

As described above the present invention requires in addition to the interposition of a column of acoustically different material between the transducer and the material to be tested means for eliminating the multiple resonances of the column. In the preferred modification this involves an electrical means with special time constant circuits. However, when the same effect is obtained by lengthening the column the same essential functions are performed because then only a single time constant is required in the amplifying circuits. It should be realized that the function is being performed by a combination of two factors, namely column length and circuit time constants, and this is just as true whether the effect is with a short column and a special electrical circuit or with the standard circuits and a lengthened column.

I claim:

1. In an ultrasonic resonance thickness measuring device comprising a variable frequency electronic generator, means for varying the frequency over a predetermined frequency range, an electromechanical transducer means for generating sonic vibrations and transmitting the same to the material to be tested, the improvement which comprises (a) a column of material of very different acoustic properties from that of the transducer interposed between the transducer and the material to be tested, the column length being much greater than a half wavelength at the sonic frequencies generated so that multiple resonances are formed in the column, (b) electronic indicating means associated with the oscillator and indicating frequencies of resonance, (c) said column length and electronic means having a relation of column length to electronic circuit time constant such that frequencies of resonance of the material to be tested can be detected and measured separately from the multiple resonances of the intervening column.

2. A device according to claim 1 in which the electronic means reproduce frequencies of resonance of the material at a different level than multiple column resonances and means are provided for distinguishing between said output levels.

3. A device according to claim 2 in which the electronic means indicate frequencies of resonance of the material to be tested at a higher level than frequencies of multiple column resonance.

4. A device according to claim 1 in which the electronic circuits add frequencies of material resonance to frequencies of multiple column resonance.

5. A device according to claim 1 in which the electronic circuits subtract indications of frequencies of multiple column resonances from those of the material to be tested.

6. A measuring device according to claim 1 in which the indicating means is an oscilloscope and the variable frequency electric generator is a frequency modulated generator sweeping continuously cyclically through a predetermined frequency range at a predetermined repetition rate, and the horizontal sweep of the oscilloscope is in synchronism to the repetition rate.

7. A measuring instrument according to claim 6 in which the column is a column of liquid.

8. A measuring device according to claim 7 for testing materials at elevated temperatures comprising means for providing a continuous flow of liquid through the column at a rate to prevent extensive transmission of heat to the electro-mechanical transducer.

9. A device according to claim 1 in which the column is a liquid column.

10. A device according to claim 6 in which a portion of the output of the variable frequency generator is amplified in a circuit of relatively short time constant followed by integration in a circuit of relatively longer time constant, the amplifier being provided with bias control over a sufficient range to record only peaks of superimposed resonances from the test material on the cathode ray tube of the oscilloscope.

11. A device according to claim 1 in which adjustment of the relation of column length to time constant is effected solely by varying the column length.

12. A device according to claim 6 in which adjustment of the relation of column length to time constant is effected solely by varying the column length.

References Cited in the file of this patent

UNITED STATES PATENTS

| | | |
|---|---|---|
| 2,538,114 | Mason | Jan. 16, 1951 |
| 2,697,936 | Farrow | Dec. 28, 1954 |
| 2,956,185 | Von Stocker | Oct. 11, 1960 |
| 3,009,353 | Erdman | Nov. 21, 1961 |

OTHER REFERENCES

McMaster: Nondestructive Testing Handbook, vol. 11, sect. 43, p. 15, New York, Ronald Press Co., 1959.